(Model.)
W. W. & W. STAGE.
SWINGING GATE.
No. 343,550. Patented June 8, 1886.
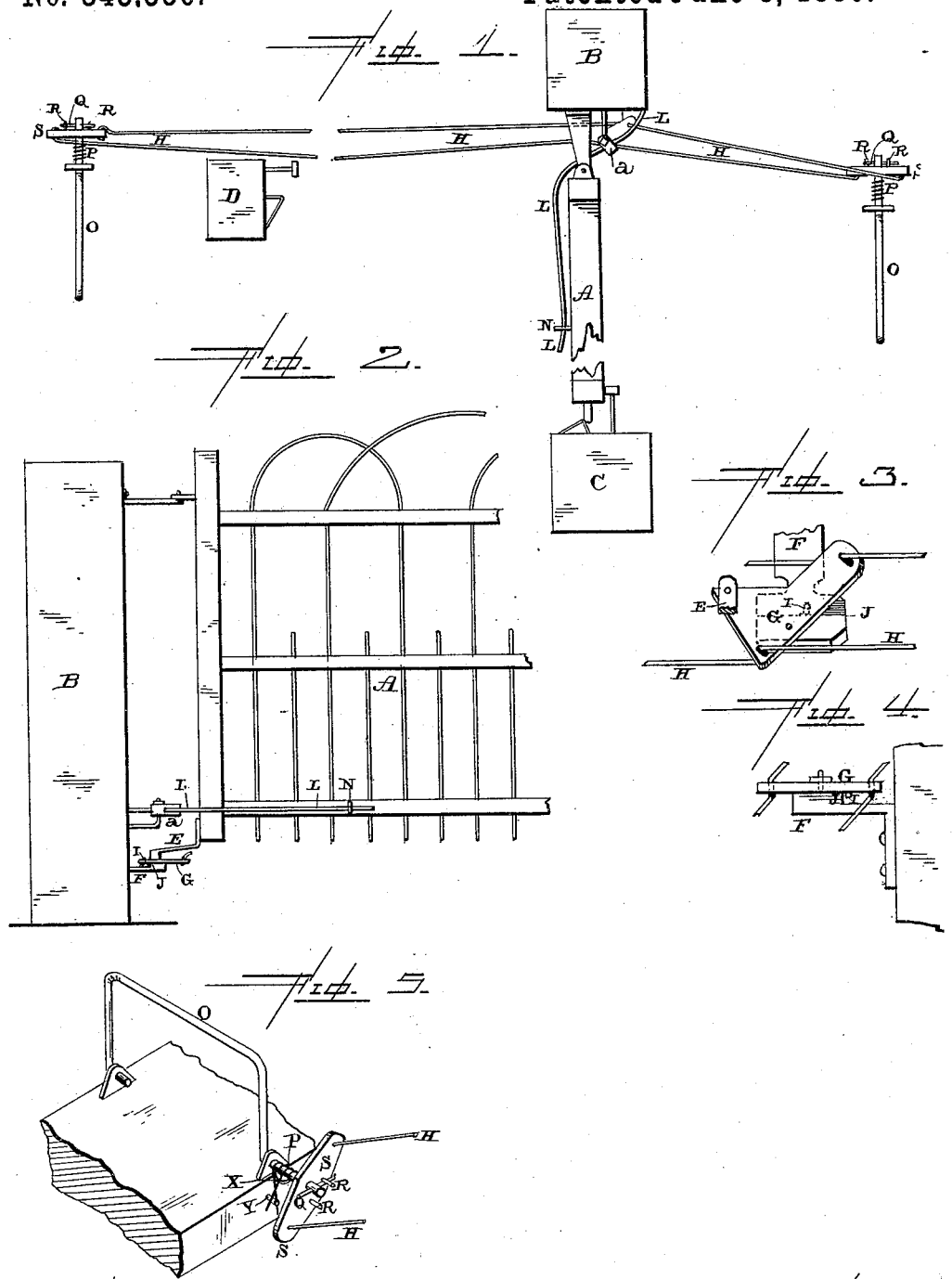
Witnesses.
L. J. Gardner
A. T. Brecht
Inventor
W. W. Stage
Ward Stage
per J. A. Lehmann, Atty.
N. PETERS, Photo-Lithographer, Washington, D. C.

UNITED STATES PATENT OFFICE.

WILLARD W. STAGE AND WARD STAGE, OF HAW PATCH, INDIANA.

SWINGING GATE.

SPECIFICATION forming part of Letters Patent No. 343,550, dated June 8, 1886.

Application filed November 4, 1885. Serial No. 181,862. (Model.)

*To all whom it may concern:*

Be it known that we, WILLARD W. STAGE and WARD STAGE, of Haw Patch, in the county of Lagrange and State of Indiana, have invented certain new and useful Improvements in Swinging Gates; and we do hereby declare the following to be a full, clear, and exact description of the invention, such as will enable others skilled in the art to which it pertains to make and use it, reference being had to the accompanying drawings, which form part of this specification.

Our invention relates to an improvement in swinging gates; and it consists in, first, the combination of the crank having a pin secured to its end and extending at right angles thereto, the spring and the pin for the ends of the spring to catch against, with the lever provided with studs, the wires or rods connected to opposite ends of the lever, the pivoted plate, and the gate; second, the combination of the flanged support upon the post to which the gate is hinged, and the plate upon which the lower pivot of the gate is journaled, and which is provided with a stud upon its under side for striking against the flange, and thus preventing the operating-rods from moving the plate beyond a certain point; third, the combination of the gate, the post upon which the gate is hinged, a suitable support placed thereon, a bent spring, and the loop on the gate to guide the spring, all of which will be more fully described hereinafter.

The object of this invention is to produce a gate which opens and closes upon the same side, and which will always operate with ease and certainty, and to so combine the parts that the operating cranks and wires or rods will always exert a pull upon the pivoted plate which moves the gate when the gate is either opened or closed.

Figure 1 is a plan view of a gate embodying our invention. Fig. 2 is a side elevation of the same. Fig. 3 is an enlarged detail view of the mechanism connected to the lower pivot of the gate. Fig. 4 is an enlarged side elevation of the same part, and Fig. 5 is a detail view.

A represents the gate; B, the post on which the gate is hung; C, the post against which the gate closes, and D the post against which the gate opens. The lower pivot, E, of the gate is made to extend farther back from the rear edge of the gate than the upper one, so as to allow this pivot E to be moved in different directions, and thus cause the gate to open or close, as may be desired.

Projecting from the post B is the flanged supporting-plate F, upon which is pivoted the plate G, in which the pivot E of the gate is journaled. This plate G may either be made of the shape here shown or any other that may be preferred, and has its outer end projecting far enough beyond its support to give the pivot E of the gate any desired amount of play, and has its rear end projecting a corresponding distance to the rear of the pivot, so as to allow the two operating wires, rods, or chains H to be connected thereto. On the under side of this pivoted plate G is formed a stop or projection, I, which, by striking against the flange J on the support, prevents the plate G from being moved beyond a certain point in either direction. To the front or outer end of the plate are secured the other two rods, wires, or chains, by means of which the plate is moved in the usual manner. The pivot E of the gate, instead of being journaled in the center of the end of this plate G, is pivoted at one corner and to one side of the center, so that no movement of the plate can possibly throw the center of gravity of the gate beyond that side upon which it is desired to have the gate open and close. Heretofore the lower pivot of the gate has been placed upon the moving plate in such a manner that when the plate is moved it will cause the gate to open in either direction that may be desired. Wishing to avoid the opening of the gate upon both sides, this pivot E is thrown to one side of the plate so far that the gate will open upon one side only.

Secured by means of the support *a* upon the post B is a spring, L, which is preferably bent, as shown, and which has its outer free end passed through a loop, N, on the side of the gate, so that as the gate is opened or closed this outer end of the spring will move freely back and forth through this loop. The inner end of this spring as the gate touches catches against the post B, as shown. While the gate is closed no special tension is exerted by the spring upon the gate; but when the gate is to be opened the first movement of the inner end of the gate causes a tension upon the gate sufficiently great to start the gate to swing open. The shifting of the pivot E in the act of opening the gate exerts a tension upon the spring and against the gate, causing the gate to swing open as soon as it becomes unlatched. When the gate is open, the bent portion of the spring bears against the post B, so that when the pivot E is shifted to close the gate a like tension is produced by the spring upon the gate, so as to cause it to begin to close as soon as it is free to do so.

The cranks O, which are to be struck by the wheels of the vehicles which are passing through the gate, have springs P applied to their ends, as shown, for the purpose of always returning the crank to position after having been moved. Each spring consists of a suitable wire, which is wrapped around the end of the crank, and which has its two ends passed through the staple or loop X in opposite directions. When the crank is turned, one end of this spring strikes against a stop, Y, and thus causes the spring to exert a tension on the crank to make it fly back to place as soon as it is released from the wheel. Always standing in a vertical position they are ready to be struck by the wheels at any time, and thus only a single instead of a double crank is needed.

To that end of the crank to which the operating-lever is applied is fastened a pin or projection, Q, which extends beyond its opposite sides, and which pin Q, as the crank is turned, strikes alternately against the studs R on the side of the operating-lever S. When the crank is moved in one direction, this pin strikes against one of the studs on the operating-lever, and thus causes the operating wires, rods, or chains to turn the plate G upon its pivot, and thus shift the lower pivot, E, of the gate in such a manner as to cause the gate to either open or close, as may be desired. The pin on the end of the crank stands at right angles to a line joining the two studs, and hence the crank will move through a portion of the circle before the pin is made to operate upon either one of the studs for the purpose of opening or closing the gate. The object sought to be obtained by this construction is to produce the same travel of a rod or wire as that of the old style of perpendicular lever with one that is less in length. This construction may be slightly modified without departing from the spirit of our invention.

Having thus described our invention, we claim—

1. The combination of the crank O, having the pin Q secured to its end and extending at an angle thereto, the spring P, and pin Y, for the ends of the spring to catch against, with the lever S, provided with studs R, the wires or rods H, connected to opposite ends of the lever, the pivoted plate, and the gate, substantially as shown.

2. The combination of the flanged support upon the post B, and the plate upon which the lower pivot of the gate is journaled, and which is provided with a stud upon its under side for striking against the flange, and thus preventing the operating-rods from moving the plate beyond a certain point, substantially as set forth.

3. The combination of the gate, the post B, a suitable support, a, placed thereon, the bent spring L, and the loop N on the gate to guide the end of the spring, substantially as specified.

In testimony whereof we affix our signatures in presence of two witnesses.

WILLARD W. STAGE.
WARD STAGE.

Witnesses:
MOSE HECHT,
AMOS J. YODER.